(12) United States Patent
Robusto et al.

(10) Patent No.: US 7,457,803 B1
(45) Date of Patent: Nov. 25, 2008

(54) METHOD FOR PROCESSING DATA

(75) Inventors: John D. Robusto, Herndon, VA (US); Greg R. McBroome, Aurora, CO (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 08/747,799

(22) Filed: Nov. 8, 1996

(51) Int. Cl.
*G06F 17/30* (2006.01)
(52) U.S. Cl. .................. 707/10; 364/231.4; 364/231.6; 364/286.4; 364/286.5; 364/262.4; 364/244.3; 364/246.6; 364/253.3; 364/253; 364/927.2; 717/202; 717/200
(58) Field of Classification Search ............. 364/231.4, 364/231.6, 286.4, 286.5, 262.4, 244.3, 246.6, 364/253.3, 253, 254.9, 927.2; 711/202, 200; 707/10
See application file for complete search history.

(56) References Cited

U.S. PATENT DOCUMENTS

| | | | | |
|---|---|---|---|---|
| 4,691,340 A | * | 9/1987 | Maeda et al. | 379/96 |
| 5,109,487 A | * | 4/1992 | Ohgomori et al. | 395/200 |
| 5,200,993 A | * | 4/1993 | Wheeler et al. | 379/96 |
| 5,261,070 A | * | 11/1993 | Ohta | 395/425 |
| 5,408,608 A | * | 4/1995 | Ryu et al. | 395/200 |
| 5,528,492 A | * | 6/1996 | Fukushima | 364/419.19 |
| 5,572,652 A | * | 11/1996 | Robusto et al. | 395/326 |
| 5,687,347 A | * | 11/1997 | Omura et al. | 395/439 |

* cited by examiner

*Primary Examiner*—Thomas G. Black
*Assistant Examiner*—Jean M. Corrielus
(74) *Attorney, Agent, or Firm*—Elmer Goshon; Alan P. Klein

(57) ABSTRACT

Improved method involving a series of unique steps for progressively and selectively processing data relative to a multi-terminal computer network for storing, analizing and periodically upgrading stored data where the network is made up of one or more user terminals, an n-dimensional multicell memory, an electronically transportable metafile structure of ranked/indexed commands for any terminal user, a common metafile interface interchange agreement and an encoded access arrangement. By reason of each metafile structure being arranged between the interface interchange agreement and any user terminal; and by reason of the encoded access arrangement being arranged between the memory and the interchange arrangement, controlled and authorized access by any terminal user is maintained for reading, interpreting, adding, combining, modifying, etc. any data in the network whether data is from the memory, interchange arrangement or input from a user terminal.

14 Claims, 7 Drawing Sheets

TABLE I
REPRESENTATIVE ENCODED BOUNDARY DELIMITER COMMANDS
(BDCs) FOR ANY ETMFS MEANS OF MULTITERMINAL COMPUTER
NETWORK (MTCN) MEANS

| ETMFS DLC NAME | ETMFS STATE | ETMFS SUBSTATE | COMMON PARAMETER LENGTH (CPL) |
|---|---|---|---|
| BEGIN ETMFS | 10 | 1 | X |
| BEGIN TRANSPORT (T) STATE FOR ETMFS | | 2 | X |
| BEGIN T BODY STATE FOR ETMFS | | 3 | 0 |
| BEGIN PROFILE STATE FOR TETMFS | | 4 | X |
| BEGIN PROFILE BODY STATE/TETMFS | | 5 | 0 |
| END PROFILE STATE OF TETMFS | | 6 | 0 |
| END TRANSPORT STATE OF TETMFS | | 7 | 0 |
| END ETMFS AS TRANSPORTED AND PROFILED | ↓ | 8 | 0 |

Fig. 4

TABLE II
REPRESENTATIVE BEGIN ETMFS BDC FOR ANY ETMFS
OF MTCN MEANS IN RESPONSE TO A USER REQUEST AT
A TERMINAL MEANS THEREOF

| ETMFS STATE | ETMFS SUBSTATE |
|---|---|
| ETMFS PARAMETER LENGTH = | n + 1 |
| LENGTH = n (EVEN) | C1 |
| C2 | ... |
| Cn | 0 |

Fig. 4A

TABLE III
REPRESENTATIVE ETMFS DESCRIPTOR COMMANDS (DCs) FOR ANY ETMFS
OF MTCN MEANS

| ETMFS DC NAME | ETMFS STATE | ETMFS SUBSTATE | CPL |
|---|---|---|---|
| ETMFS VERSION | 20 | 1 | 2 |
| ETMFS SECURITY | 20 | 2 | X |
| ETMFS SUBSCRIPTION | 20 | 3 | X |
| ETMS CONFIGURATION | 20 | 4 | 2 |
| ETMFS CONFIGURATION DATA | 20 | 5 | X |
| ETMFS META DATA | 20 | 6 | X |
| ETMFS INDEX | 20 | 7 | X |

Fig.5

TABLE IV
REPRESENTATIVE TRANSPORT BODY DESCRIPTOR COMMANDS
FOR ANY ETMFS OF MTCN MEANS

| ETMFS TBDC NAME | ETMFS TBDC STATE | ETMFS TBDC SUBSTATE | CPL |
|---|---|---|---|
| ETMFS TB SECURITY | 30 | 1 | X |
| ETMFS TB META DATA | 30 | 2 | X |
| ETMFS TB INDEX | 30 | 3 | X |

Fig.6

TABLE V
REPRESENTATIVE PROFILE BODY DCs
FOR ANY ETMFS OF MTCN MEANS

| ETMFS PB DC NAME | ETMFS PBDC STATE | ETMFS PBDC SUBSTATE | CPL |
|---|---|---|---|
| ETMFS PB SECURITY | 40 | 1 | X |
| ETMFS PB METADATA | 40 | 2 | X |
| ETMFS PB SECURITY | 40 | 3 | X |

Fig. 7

TABLE VI
REPRESENTATIVE PROFILE BODY DCs
FOR ANY ETMFS OF MTCN MEANS

| ETMFS P DC NAME | ETMFS P STATE | ETMFS P SUBSTATE | CPL |
|---|---|---|---|
| ETMFS P COMMAND | 50 | 1 | X |
| ETMFS P OBJECT | 50 | 2 | X |

Fig.8

TABLE VII
REPRESENTATIVE TERMINAL USER ESCAPE COMMAND

| ETMFS EC | ETMFS EC STATE | ETMFS EC SUBSTATE | CPL |
|---|---|---|---|
| EC | 60 | 10 | X |

Fig. 9

TABLE VIII
REPRESENTATIVE VERSION DC IN MULTIPLE ROW, COLUM-LIKE BLOCK
FORMAT FOR ANY ETMFS OF MTCN MEANS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ETMFS VDC STATE ||||||||  ETMFS VDC SUBSTATE ||||||||
| CPL ||||||||||||||||
| VERSION ||||||||||||||||

Fig. 10

TABLE IX
REPRESENTATIVE SUBSCRIPTION CONTENTS TABLE FOR SUBSCRIPTION DC
FOR ANY ETMFS OF MTCN MEANS

| NAME | IDENTIFIER |
|---|---|
| USER NAME | LOGIN NAME |
| PASSWORD | LOGIN PASSWORD |
| HOST NAME | COMPUTER HOST NAME OR IP ADDRESS |
| UNIFORM RESOURCE LOCATOR (URL) | URL IDENTIFIER WHAT TECHNIQUE SHALL BE USED TO TRANSFER ANY ETMFS: E-MAIL, FTP, HTTP, ASYNCHRONOUS, ETC. |
| DIRECTORY | WHERE ANY ETMFS IS TO BE DEPOSITED |
| FILE NAME | WHAT IS FILE NAME WHEN DEPOSITED IN ABOVE DIRECTORY |
| OBJECT NAME | HOW IS OBJECT DATA TO BE STORED. "0" FOR META DATA ONLY; "1" FOR OBJECT DATA STORED IN ETMFS; AND "2" FOR URL FOR STRING POINTING TO OBJECT DATA OF ETMFS. |

Fig. 11

TABLE X
REPRESENTATIVE PROFILE OBJECT DC IN MULTIPLE ROW, COLUMN-LIKE BLOCK
FORMAT FOR ANY ETMFS OF MTCN MEANS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| ETMFS STATE ||||||||  ETMFS SUBSTATE ||||||||
| CPL ||||||||||||||||
| OBJECT TYPE ||||||||||||||||
| LENGTH = a |||||||| C1 ||||||||
| C2 |||||||| ||||||||
| Ca |||||||| ||||||||
| OBJECT STORAGE ||||||||||||||||
| OBJECT DATA ||||||||||||||||

Fig. 12

METHOD FOR PROCESSING DATA

The invention concerns an improved method involving a series of steps for selectively and progressively processing data in unique fashion between memory means of a multiterminal computer network and a selectively operable user terminal means thereof. And more particularly, it relates to an improved method having a series of steps for selectively and progressively processing data by a multiterminal computer network having a multicell network memory, common metafile interface interchange means, an electronically transportable metafile structure with ranked/indexed commands with different designations and encoded access means. By reasons of these various means in making up a network, authorized access by any user at any terminal is only permitted so that any memory data may be precisely extracted for review, analysis and combined (fused) with other data for the purpose of enhancing and contributing to the memory stored information in meeting mission network requirements. Conversely, any data after being reviewed, etc. by any terminal user can be precisely emplaced in the memory so that the emplaced data can be subsequently extracted in whole or in part in response to commands by any subsequent or current other user of the network.

BACKGROUND OF THE INVENTION

Various computer systems have been designed in the past for handling and processing data. For example, U.S. Pat. No. 5,369,742 to Y. Kurosa et al. concerns an image filing and retrieval apparatus and method for carrying out filing and retrieving of data as required. With reference to the species of FIG. 1, the apparatus for carrying out the method is generally comprised of a scanner for inputting optical image data to an optical disk for storage. A keyboard is provided for inputting user demand data. A convolution calculating circuit is provided for furnishing weighted or fuzzy logic for facilitating display of stored data in both text and nontext format. However, the reference does not remotely suggest the improved method selecting steps of the instant invention as effected by and for use with a multiterminal computer network (MTCN) means having a novel common metafile interface interchange (CMFII) means, encoded access (EA) means, network memory means and electronically transportable metafile structure (ETMFS) means. Accordingly, any authorized terminal user may selectively access the interface means and/or the memory means upon selecting various ranked/indexed commands of the ETMFS means associated therewith for reviewing and analizing any data including any metadata that stems from the memory means as well as terminal input data from any current terminal user of the MTCN means; all for the benefit of any subsequent or current other user of the MTCN means as well as contributing to mission requirements thereof. Whenever data is to be extracted from the memory means or to be emplaced therein as the result of user selected commands from one or more ETMFS means, EA means provide appropriate code designations for correctly reemplacing the data including metadata in one or more cells of the memory in precise dimensional fashion including the emplacement of any combined or fused data at a dimensional location of one or more cells where such cell dimensions have no data entry to date. Conversely when user commands relative to an ETMFS means extract various data from the memory means, EA means provide appropriate code designations for extracting the data unless some or all of the data is already located at the CMFII means as the result of prior activity by users at one or more terminals and the ETMFS means associated therewith.

SUMMARY OF THE INVENTION

An object of the invention is to provide an improved method for effecting enhanced use of a multi-terminal computer network means by providing a novel common metafile interface interchange means and electronically transportable metafile structure means associated therewith that enables any authorized terminal user of the network to select one or more command functions of the metafile structure means for enabling review and analysis of data stemming from the memory means or interchange means if already extracted from the memory means for the purpose of assisting the terminal user as well as permitting such user to add data relative to one or more command functions of the metafile structure means so as to provide further information relative to a subject for any subsequent or current other user of the network in carrying out the mission thereof.

Another object of the invention is to provide an improved method as effected by a multiterminal computer network means provided with common metafile interface interchange means having one or more electronically transportable metafile structure means for connectivity with any network user terminal for enabling an authorized user to review and analize user selected stored data as well as contribute terminal input data whether such data is text data, graphical data or any combination thereof.

And still another object of the invention is to provide an improved method having selecting steps for procuring data as effected by a multiterminal computer network means having a network memory means, common metafile interface interchange means, electronically transportable metafile structure means and encoded access means; all of which enable a user at a terminal in selecting various ranked/indexed commands of the metafile structure means to extract or emplace data from or to the memory means in precise dimensional fashion in order to attempt to progressively meet the mission requirements of the network as result of user analysis of extracted data including terminal input data relative to his/her expertise at a network computer terminal.

Still another object of the invention is to provide an improved method having a series of command selecting steps for effecting enhanced use of a multiterminal computer network for selectively processing data by providing a novel common metafile interface exchange means having one or more electronically transportable metafile structure means with relational and ranked/ordered user command functions for assisting any authorized terminal user of the network relative to the user data selected for the purpose of reading, adding, deleting data, etc. all for the purpose of attempting to meet mission requirements of the network as well as contributing to the assistance of any subsequent or current other network user.

In summary, the improved method involves a series of unique steps for carrying out the selective operation of a multi-terminal computer network as effected by a novel common metafile interface interchange (CMFII) means via one or more electronically transportable metafile structure (ETMFS) means thereof that permits connectivity to any terminal in response to an authorized user threat. As a result of this connectivity by any ETMFS means, processed data of the CMFII means whether from the computer memory or a user terminal input and whether textual, graphic or any combination thereof is readily available for any current other user of the network or any subsequent user thereof in meeting network mission requirements. One of the advantages of the improved method is that the novel interchange means via the ETMFS means thereof provides an architecture of hierarchial order of various command functions and indices all with sufficient definition for any user so as to enable selected access by any authorized user in reviewing and analizing selected data or adding data thereto. Also, the network is comprised of encoded access means for facilitating the extraction or emplacement, in precise dimensional fashion, of data including metadata and fused data from or to the network memory.

In view of the foregoing, other objects and advantages of the invention will become more apparent when taken in conjunction with the appended specification, claims and drawings as hereinafter described.

BRIEF DESCRIPTION OF THE DRAWINGS

FIG. 4 is a schematic view of a multiple block configuration format for carrying out various code designations for a Boundary Delimiter Command (BCD) function as generally specified in FIG. 3.

FIG. 4A is another schematic view that illustrates another block format and further definition of one of the BCD functions of FIG. 4.

FIGS. 5-8 are diagrammatic views; with each diagrammatic view being a representative multiple column, row arrangement in block-like configuration as formatted for carrying out various code designations for any given Descriptor Command (DC) function relative to any ETMFS means and as generally specified in FIG. 3.

FIG. 9 is a diagrammatic view similar to FIGS. 5-8 but for a terminal user escape command.

FIG. 10 is a diagrammatic view that illustrates in block format a DC designated VERSION and it illustrates further encoding definition thereof.

FIG. 11 is a schematic view of a representative subscription contents table for a subscription DC function as generally specified in FIGS. 3 and 5.

FIG. 12 is a schematic view of a representative profile object table for a profile object DC function as generally specified in FIGS. 3 and 9.

DETAILED DESCRIPTION OF THE INVENTION

Figure 1:
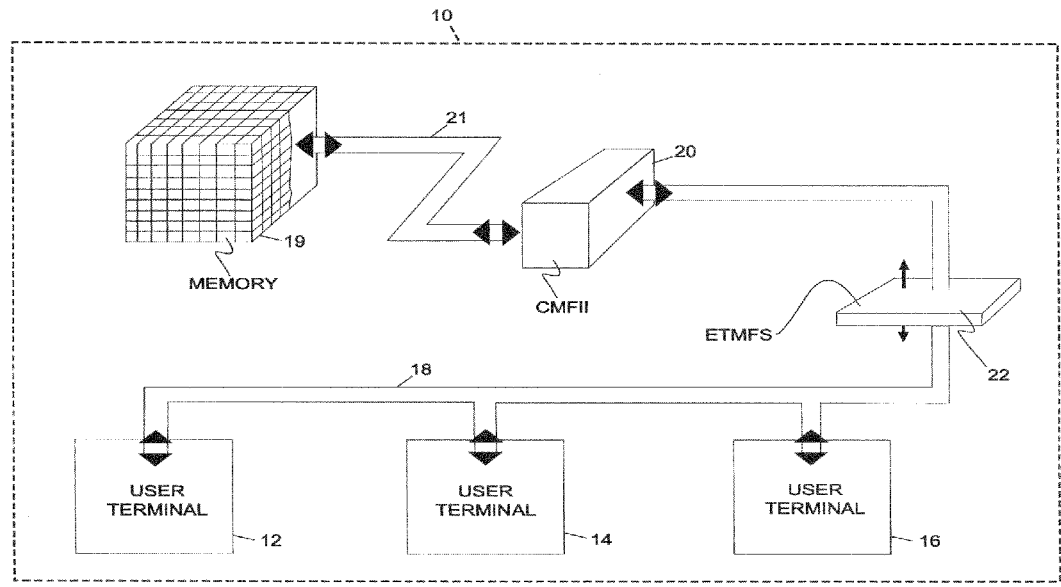
FIG. 1 is a schematic view in dotted and solid lines (with certain parts broken away) of a multiterminal computer network means; and it illustrates the network means having among other things a common computer metafile interface interchange (CMFII) means and an electronically transportable metafile structure (ETMFS) means; all for the purpose of carrying out the unique steps of the improved method of the invention.

With further reference to FIG. 1 of the drawings, it illustrates an embodiment for carrying out various steps of the improved method. The embodiment is generally comprised of a multi-terminal computer network means 10 having a series of three user terminals 12, 14 and 16 all interconnected by common bus means 18. In order to facilitate connectivity from any user terminal of the network regardless of any terminal location to a multi-cell or multi-bin memory means 19, a novel metafile interface interchange (CMFII) means 20, bus means 21 including encoded access (EA) means therein and an electronically transportable metafile structure (ETMFS) means 22 are provided so that any authorized user at any given terminal of the network has selected access to the CMFII means in carrying out a task for an overall mission of the network. An authorized user at any terminal 12, 14 or 16 in response to various ranked/indexed commands of the ETMFS means has selected access to data of the CMFII means or the memory means for causing extraction or emplacement of the selected data from or to the memory means all for enabling review or upgrade of the memory data in meeting network mission requirements. Although only a few cells 19 are shown [by dotted lined] in the memory means, it is to be understood that these cells or bins extend throughout the memory means, with each cell or bin being of corresponding cubicle shape.

Figure 1A:
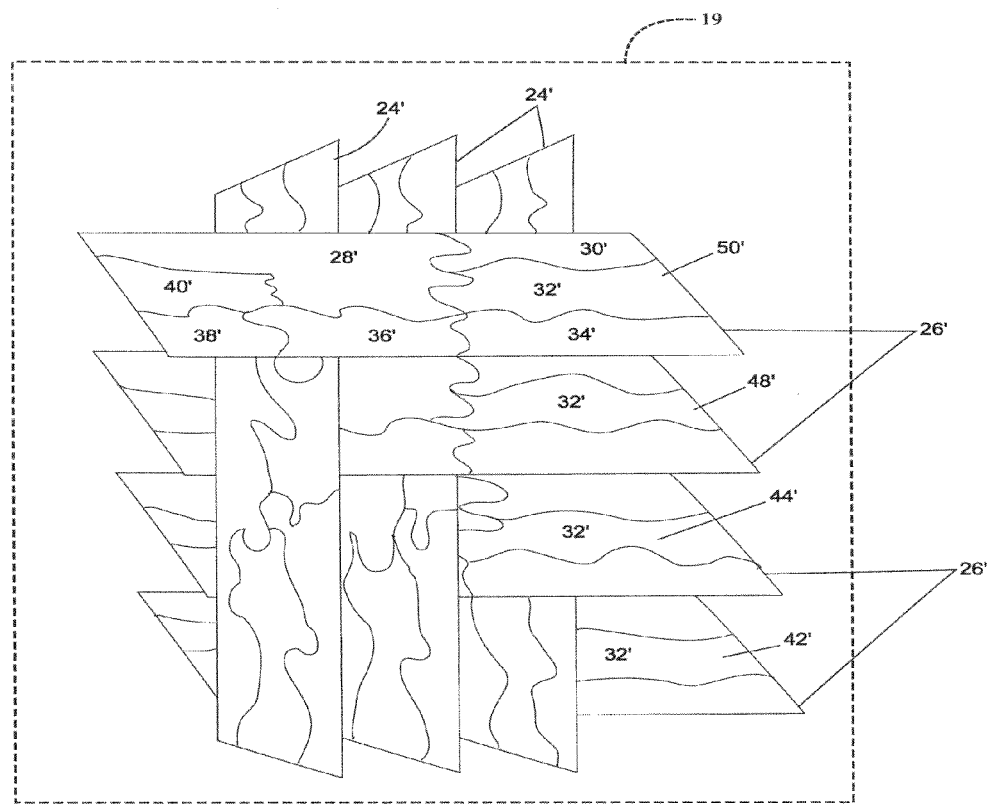
FIG. 1A is an exploded view of the memory as shown in FIG. 1 with parts added and other parts removed; and it illustrates in depicting the memory as made up of orthogonally related and opposed series of data matrices (chessboards), with each chessboard having parts of memory cells therein.

With reference to FIG. 1A, multicell memory means 19 is depicted as made up of a series of laterally spaced chessboards 24' in one direction and another series of laterally spaced chessboards 26' extending in another and orthogonal direction relative to series 24'. Each memory chessboard 24' or 26' of either series includes various types of data 28', 30', 32', 34', 36', 38' and 40' stored therein, with each stored data 28', 30', 32', etc. usually having an irregular outlined area on any chessboard 24' or 26'. Each type of data within its irregular area of any chessboard and each area normally includes more than one memory cell and various parts thereof. Also, each type of data could include various combinations of object data, geographic data, combined (fused data) etc. Because of the extent of various types of data stored throughout memory means 19, EA means of bus means 21 are required to assure proper emplacement or retraction of data in precise dimensional fashion from or to more than one cell of memory means 19 in response to any command request of any terminal user relative to its associated ETMFS means 22. Moreover, whenever a metadata request occurs from a terminal user relative to his/her ETMFS means 22, EA means 21 provides an encoded request in precise fashion that extracts general data from data stored in memory means 19 such as its stored data 32' as exemplified by spaced data points therein for a metadata selection, namely; 42', 44', 48' and 50' as located in more than one chessboard of the series of four chessboards 26' as depicted in FIG. 1A. Of course, one of the advantages of metadata is that it minimizes bandwidth requirements while at the same time providing a terminal-user general review of certain data in order that correct or desired data can be retrieved for review by a terminal user when once identified by preliminary metadata review technique.

Figure 1B:
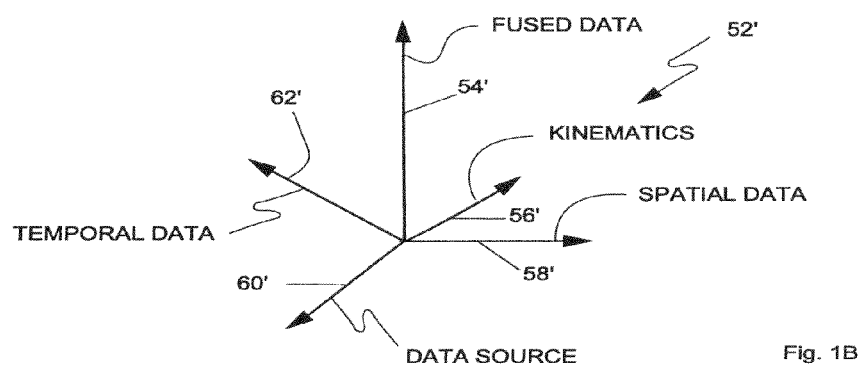
FIG. 1B is a diagrammatic perspective view and it illustrates a representative encoded access means for the network memory as a pointer having a multivector, data-reference configuration that generates from a common point.

In order to assure precise extraction or emplacement of data from or to memory means 19, a representative multivector, data-reference pointer 52' as encoded access (EA) means for profile object data as processed by any ETMFS means 22 in connection with any user terminal of the computer network is shown in FIG. 1B. To this end, pointer 52' is comprised of a fused data vector 54', kinematics vector 56', spatial data vector 58', data source vector 60' and temporal data vector 62'. As evident from this Figure, each vector has a particular magnitude and direction that is representative of the data to be stored or extracted from memory means 19 as well as how it is to be stored therein both cellwise and one or more data patterns therein such as patterns 28'30', 32'34', 36', etc. as aforedescribed. Inasmuch as EA means is part of bus means 21 as well as it stems from CMFII means; the profile object data of any ETMFS means 22 at any terminal can be readily extracted from memory means 19 in response to a terminal user selection of various commands from an ETMFS means 22 as subsequently described with reference to FIG. 3. Also, the extracted profile object data with or without modification can again be reemplaced in memory means 19 after any terminal user has reviewed the extracted data including but not limited to selective data deletion, combining of data, adding of terminal input data, etc., all for a terminal user with expertise to contribute to the overall mission requirements of the MTCN means. Hence, it is to be understood that pointer 52' as one EA means is merely representative of one overall profile object data condition as it is being extracted from or emplaced to the memory means. Thus, every pointer by reason of its particular multivector configuration represents the data associated therewith and consequently distinguishes from any other pointer of the EA means for any MTCN means and the data represented by other pointers of the EA means thereof. Moreover, the various designated vectors of pointer 52' constitute various attributes or types of data that make up profile object data from an ETMFS means 22 as either being stored or extracted from memory means 19.

Figure 2:
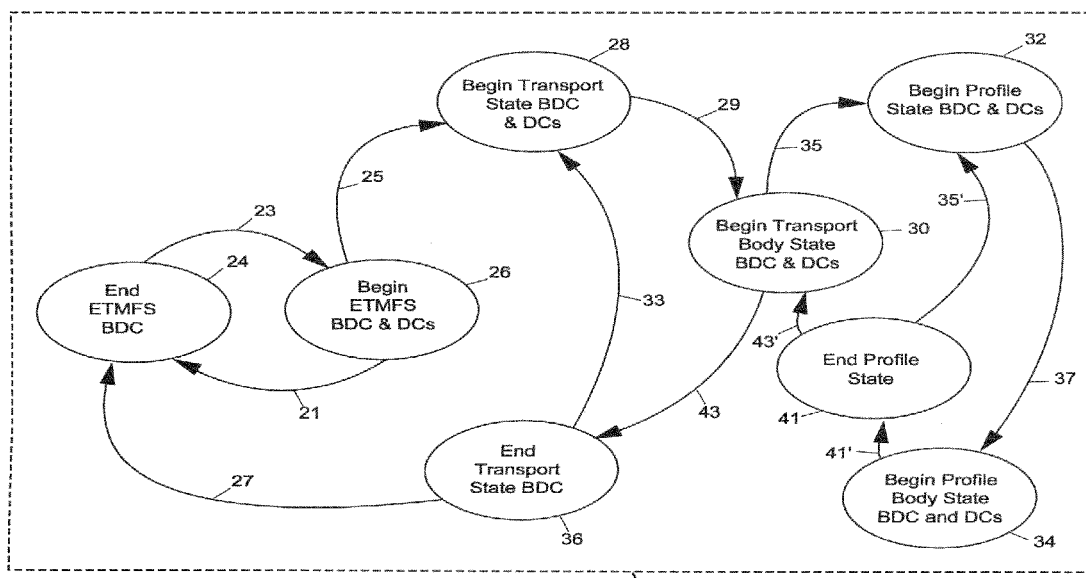
FIG. 2 is a representative diagrammatic view of various states of an ETMFS means; and it illustrates these states in progressive and interrelated fashion and in response to an authorized user selected commands at any user terminal means of the network means in carrying out one or more steps of the improved method.
Figure 3:
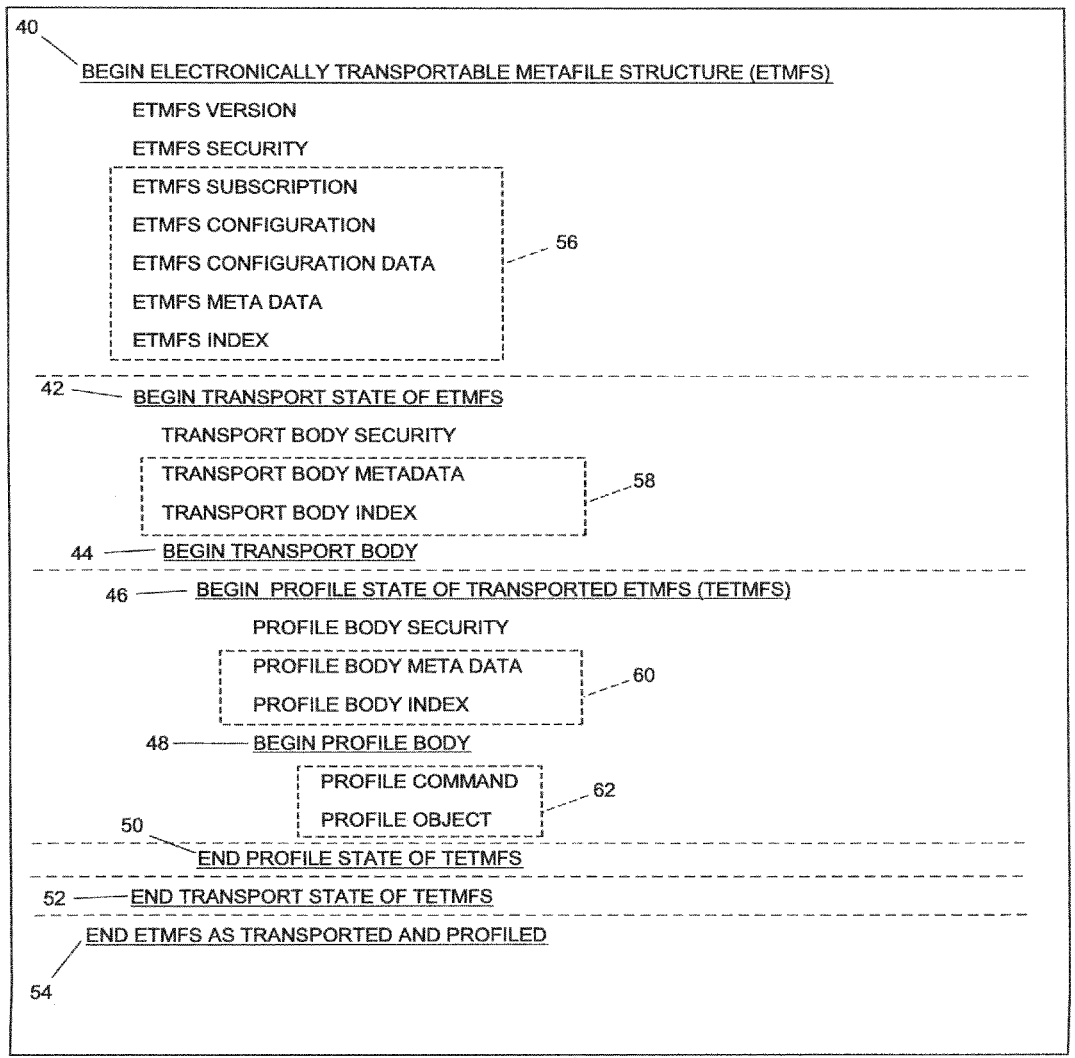
FIG. 3 is also a diagrammatic view in dotted and solid lines of a representative multicommand stricture of an ETMFS means as ranked and indexed in directory-like fashion.

As further evident in FIG. 2, various states of an electronically transportable metafile structure (ETMFS) means 17 are generally specified. As exemplified by the series of interconnected circles 24, 26, 28, 30, 32, 34, 36 and 41 various states of an ETMFS means are depicted including the functional relationship between more than one state of ETMFS means 17 during an operative cycle between CMFII means 20 and any user at terminal means 12, 14 or 16. As further exemplified in FIG. 3, a representative hierarchial (ranked/indexed) structure 38 of an ETMFS means is depicted. Ranked/indexed structure 38 of an ETMFS means is made up of a series of boundary delimiter commands (BDCs) 40, 42, 44, 46, 48, 50, 52 and 54. The other ranked/indexed and separate series of commands under any BDC 40, 42, 44, 46, or 48 concern descriptor commands (DCs). Some of the DCs under any BDC of an ETMFS means are optionable for any authorized user at a terminal means of MTCN means 10 as indicated by encircling dotted lines 56, 58, 60 and 62. In other words, these DCs within any dotted line encircled area 56, 58, 60 or 62 may be selected in whole or in part by any terminal user of the MTCN means during any data processing application by MTCN means 10 at one of its terminal means being accessed by any authorized user thereof. Although not shown in FIG. 3, there is an authorized user escape command at any terminal means 12, 14, 16, etc. whenever an authorized user for whatever reason wants to escape at any command function level as depicted in FIG. 3 between the functional BDCs commands of begin ETMFS BDC state 40 and end ETMFS BDC state 54. For any begin BDC 40, 42 or 46 there is always security, metadata and index DCs thereunder. More than one profile command and object DCs as indicated at 62 can be provided for any ETMF means in nested, ranked and indexed relation as required in meeting the requirements of any ETMF means in carrying out the mission requirements of any MTCN terminal means 12, 14 or 16.

With further reference to FIG. 2 after end ETMFS means BDC state 24 for a prior processed ETMFS means has occurred during a previous cycle at a user terminal means of the MTCN means, a begin ETMFS means BDC and DCs state 26 occurs for the next ETMFS means as the result of it being linked to end ETMFS means BDC state 24 by an arrowed begin ETMFS means BDC and DCs link 23. It is noted here, that before another begin ETMFS means BDC and DCs state can be started in FIG. 2, an arrowed end ETMFS means BDC state link 21 from begin ETMFS BDC and DCs state 26 and arrowed end ETMFS means BDC state link 27 from end transport BDC state 36 of an ETMFS means that has been processed by MTCN means 10 must have been received by end ETMFS means BDC state 24. Similarly, an arrowed begin transport state of ETMFS means BDC link 25 is provided by begin ETMFS BDC and DCs state 26 to begin transport BDC and DCs state 28 of ETMFS means 22. On the other hand, End transport BDC state 36 in response to a processed ETMFS means thereat provides an arrowed end transport BDC state link 33 to begin transport BDC and DCs state 28. In other words without this link 33, begin transport BDC and DCs state 28 would be unable to furnish an arrowed begin transport body state BDC link 29 to begin transport body BDC and DCs state 30 for a begun ETMFS means.

A begin profile BDC state link 35 of begun and transported ETMFS means is provided from begin transport body BDC and DCs state 30 to begin profile BDC and DCs state 32. This begin profile BDC and DCs state 32 receives an arrowed begin profile BDC link 37 to begin profile body BDC and DCs state 34 so long as begin profile body BDC and DCs state 34 provides an arrowed begin profile BDC and DCs state link 37 from begin profile BDC and DCs state 32. Once begin profile body BDC and DCs state 34 received arrowed link 37, it provides an arrowed profile command/object DCs state link 41' where such link 41' provides analysis, etc. of one or more DCs of both profile commands and profile objects in response to a terminal user selection for a given ETMFS means 22 until an end profile state 41 occurs. Once begin transport body BDC and DCs state 30 receives begin profile command/object DCs link 43' from end profile state, it provides end transport BDC state link 43 to end transport BDC state 36. Link 35' at any user terminal 12, 14 or 16 indicates to begin profile state BDC and DCs 32 that a prior state BDC and DCs has occurred. Then end transport BDC state 36 of an ETMFS means provides an end ETMFS means BDC state link 27 to end ETMFS means BDC state 24 for ending an ETMFS means cycle before another ETMFS means cycle is begun in response to a user at any terminal means 12, 14 or 16 as aforedescribed. Although FIG. 2 discloses the sequential relationship between various BDCs and DCs, it does not preclude any terminal user from selecting or not selecting discretionary DCs as encircled by dotted lines 56, 58, 60 and 62 in FIG. 3. Inasmuch as each BDC 40, 42 or 46 have a metadata DC, any metadata DC electronically encoded designation is such that it minimizes bandwidth requirements in accessing its general reference data of memory means 19 via CMFII 20 in attempting to find particular data for review/analysis.

As indicated in FIG. 4, all BDCs of the series of BDCs for any ETMFS means 22 have a common state code but each BDC has a different substate code. Depending on the function of any BDC, it may or may not have a command parameter length value. The coded values for any BDC in the table of FIG. 4 can be further broken down, defined, as required for any such BDC as the representative begin ETMFS means BDC is depicted in FIG. 4A. In any event, it is evident that any BDC as encoded, such as, e.g., eight bits per byte, is electronically distinguishable from other BDCs so that the BDCs for any ETMFS means as depicted in FIG. 3 maintain their ranked/indexed order throughout use of the MTCN means.

As depicted in FIGS. 5-8, DCs for any BDC command as specified are block formatted in similar fashion as the series of BDCs; but each series of DCs under any BDC is encoded with a different and distinctive state code that is distinguishable not only from any other series of DCs state codes but also any BDC state code. Each substrate code for any series of DCs under any BDC is readily distinguishable from any other substrate code of any DC of any series of DCs. Depending on the command parameter length for any DC it will either have a nonzero or specified value. As indicated in FIG. 9, the selectively operable, escape command for any terminal user of the MTCN means has state/substate code designations that are distinguishable from any BDC or DC state/substate code values. This command is only effective between the begin and end BDC state 40 and 54 of any ETMFS means 22. As with the BDC of FIG. 4A, a version DC is further defined as to its encoding by the block table format depicted in FIG. 10. Depending on the DC it may require further definition as the subscription contents table for a subscription DC as illustrated in FIG. 11. Also, a profile object DC with its particular state/substate codes (not shown) is further defined by the table format as illustrated in FIG. 12.

While certain representative embodiments of the invention have been discussed above including various details thereof; such has been shown for the purpose of illustrating the invention. Also, it is evident that despite the ranked/indexed order of any command of any ETMFS means 22, it does not preclude any authorized user at any terminal means of the MTCN means to have selectivity in choosing DCs in carrying out and meeting the task/mission requirements of the MTCN means. Also, the CMFII means in providing the ETMFS means between the CMFII means and any user terminal permits memory stored data to be readily processed at any network terminal while at the same time it permits any terminal processed data to be returned to the CMFII means for either immediate subsequent return to another terminal for further processing or return to the memory means via bus means 21 including EA means therein for storage. At the same time, the EA means in being part of the bus means and stemming from the CMFII means assures proper storage and removal of profile object data in whole or in part in response to a terminal user command all without interfering with interaction between the CMFII means and any network terminal. Consequently, the MTCN means is a highly versatile system while at the same time the metadata DCs of any ETMFS means 22 minimize the bandwidth requirements of the MTCN means in processing data between the memory means and any user terminal. It is to be understood instead of bus means 21 and the particular shape of CMFII means as shown in FIG. 1, the CMFII means could be a shell structure encapsulating memory means 19 with appropriate EA means between the inside of the shell means and the encapsulated memory means 19. Also, bus means 18 can still appropriately interconnect any terminal means and the outer part of the shell means so that ETMF means 22 are connected between any terminal means and the shell means. It is also noted here that the transport and profile states 28 and 32 are interchangeable between any two or more metafile structures 22 without requiring the alteration of any state contained within the profile or transport state. It will be apparent to those skilled in the art that various changes in the method steps disclosed herein may be made as well as various changes for any effect in carrying out any method step as disclosed herein may also be made; all without departing from the spirit and scope of the invention as defined by the appended claims.

What is claimed is:

1. A method for progressively and selectively processing various types of data as effected by a multiterminal computer network MTCN means having n-dimensional network memory means, one or more selectively operable user terminal SOUT means, common metafile interface interchange CMFII means, encoded access EA means and electronically transportable metafile structure ETMFS means;

the ETMFS means having ranked and indexed mandatory and optionally selectable commands for obtaining stored data for a user at a SOUT means;

where one or more ETMFS means is interposed between the CMFII means and a SOUT means; and where the EA means is interposed between the memory means and the CMFII means;

comprising the steps of:

extracting data in response to one or more mandatory and selectable commands of an ETMFS means at a SOUT means as effected by a user at a SOUT means for displaying data such that the user can effect review and analysis of the extracted for the purpose of altering and adding data thereto prior to returning the data to the memory means via the CMFII means, and emplacing reviewed and analyzed data from one or more SOUT means to the CMFII means for receiving the reviewed and analized data from a SOUT means via the ETMFS means associated therewith, the EA means between the CMFII means and the memory means for precisely emplacing the reviewed/analized data from the CMFII means to more than one cell of the memory means;

whereby the memory means with user upgraded and analized stored data therein including any combined data contributes to subsequent user and current other user review and analysis at any SOUT means in attempting to continually meet the mission requirements of the MTCN means.

2. A method as set forth in claim 1, wherein the steps of extracting and emplacing data from the memory means is effected by EA means having multivectored pointer means with each vector of any pointer means representing certain data including fused data as well as attributes thereof.

3. A method as set forth in claim 1, wherein a user at any SOUT means contributes his or her own expertise in review and analysis of any data extracted from the memory means including any terminal input data, with such expertise assisting in meeting network requirements.

4. A method for progressively and selectively processing data including meta data as effected by multiterminal computer network MTCN means having memory means, one or more selectively operable user terminal SOUT means, common metafile interface interchange CMFII means and electronically transportable metafile structure ETMFS means where the CMFII means is operativley associated with the memory means and any ETMFS means and where any ETMFS means is operatively associated with any SOUT means in response to any user commands therefrom, the method comprising the steps of:

selecting in response to an authorized user command at any Sout terminal means during data processing of the MTCN means one or more boundary delimiter commands BDCs of a series of BDCs for determining the state of an ETMFS means between the CMFII means and any given SOUT means being activated by an authorized user of the MTCN means, each BDC of the series of BDCs of the ETMF means being indexed and arranged in hierarchial fashion in relation to other BDCs of the series thereof, also each BDC of the series thereof having a particular multiple row, column-like format and binary bit encoding therein so that any BDC of the series of BDCs of the ETMF means as activated by a user at any given SOUT means of the MTCN can be electronically distinguished from any other BDCs of the series of BDCs of the ETMFS means, each BDC of certain BDCs of the series of BDCs of the ETMF means also having a separate series of descriptor commands Dcs indexed thereunder in hierarchial fashion relative to each other, selecting one or more DCs of one of the separate series of DCs under any given certain BDC of the series of certain BDCs of the series of BDCs of the ETMF means in response to a user command at a SOUT means of the MTCN means; and reviewing and analyzing data under any DC of one of the separate series of DCs under any given certain BDC of the series of certain BDCs of the series of BDCs of the ETMF means as selected by a user at a SOUT means of the MTCN means in order to add, remove, alter, interpret, combine or read data thereunder relative to its associated ETMFS means for the purpose of contributing, removing or combining data from the memory means of the MTCN means in attempting to continually meet the mission requirements of the MTCN means.

5. A method as set forth in claim 4, wherein a BDC is effected by a multiple row, column-like, multiple block format with each block of the format having a particular binary code in multi-bit per byte fashion with the first double block row of any given BDC specifying a particular state in encoded fashion that is common in value to the particular state of any other BDC of the series of BDCs for any ETMFS means.

6. A method as set forth in claim 4, wherein any DC as part of any ETMFS means is maintained as to its particular ranking and indexed position relative to its associated BDC by a multirow, column block format with each row having a double block format and with each block having a particular binary code; and wherein the first double block row of any DC specifies its particular and distinctive state in electronic encoded fashion relative to its associated ETMFS means and distinguishable from any other DC of its associated ETMFS means.

7. A method as set forth in claim 4, wherein anyone DC of certain DCs of any separate series of DCs under a given BDC of the series of BDCs of an ETMF means are optional for user selection at any SOUT means during any data processing of the MTCN means.

8. A method as set forth in claim 4, wherein at least one of the DCs of any separate series of DCs under any given BDC is designated metadata, with the metadata being general reference data for assisting in selective extraction and correct identification of other more definitive data from the memory means as required while at the same time the metadata is minimizing the data processing requirements of the MTCN means between the memory means and any SOUT means thereof in assisting the user at any SOUT means in correct identification of further more definitive data for analysis and review by the user thereat.

9. A method as set forth in claim 4, wherein any authorized user at a given SOUT means of the MTCN means has an escape command for selective escape between the begin and end BDC states of an ETMFS means associated with the given SOUT means.

10. A method as set forth in claim 4, wherein any authorized user of a SOUT means can provide terminal input data in conjunction with the data extracted from the memory means during data processing of the MTCN means.

11. A method as set forth in claim 4, wherein any authorized user of a SOUT means provides expertise in review and analysis of the extracted data from the memory means including any terminal input data at the SOUT means so as to contribute to the MTCN means in meeting its task and mission requirements.

12. A method as set forth in claim 4, wherein the step of selecting one or more DCs of one of the separate series of DCs under any given BDC of the series BDCs of any ETMFS means is effected by any ETMFS means having a series of different states with each state of the series thereof having a series of DCs under a BDC of the series of BDCs thereof.

13. A method as set forth in claim 12, wherein the series of different states of any ETMFS means is made up of a begin transport state and a begin profile state.

14. A method as set forth in claim 13, wherein the begin transport state and begin profile state of any ETMFS means of the MTCN means is interchangeable with any begin transport state and begin profile state of any other ETMFS means thereof.

* * * * *